(12) United States Patent
Amin

(10) Patent No.: US 12,658,805 B2
(45) Date of Patent: Jun. 16, 2026

(54) SOFT SWITCHING FOR EFFICIENT NON-CMOS BASED DC-DC CONVERTER

(71) Applicant: Intel Corporation, Santa Clara, CA (US)

(72) Inventor: Sally Safwat Amin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 17/895,986

(22) Filed: Aug. 25, 2022

(65) Prior Publication Data

US 2024/0072662 A1 Feb. 29, 2024

(51) Int. Cl.
*H02M 3/158* (2006.01)
*H02M 1/00* (2007.01)
*H02M 1/08* (2006.01)

(52) U.S. Cl.
CPC ....... *H02M 3/1588* (2013.01); *H02M 1/0058* (2021.05); *H02M 1/08* (2013.01)

(58) Field of Classification Search
CPC .. H02M 3/158; H02M 3/1588; H02M 1/0058; H02M 1/0054; H02M 1/08; H02M 1/083; H02M 1/088
See application file for complete search history.

(56) References Cited

U.S. PATENT DOCUMENTS

| | | | | |
|---|---|---|---|---|
| 6,163,199 A * | 12/2000 | Miske | ............... | H03K 17/6872 |
| | | | | 327/434 |
| 10,122,362 B2 * | 11/2018 | Cascio | ................ | H03K 17/567 |
| 2014/0002049 A1 * | 1/2014 | Schrom | .............. | H02M 3/1588 |
| | | | | 323/311 |
| 2017/0302178 A1 * | 10/2017 | Bandyopadhyay | ..... | H02M 1/08 |
| 2019/0103812 A1 * | 4/2019 | Chang | ................... | H02M 3/158 |
| 2020/0136508 A1 * | 4/2020 | Bandyopadhyay | ...... | H03K 5/24 |
| 2021/0152090 A1 * | 5/2021 | Amin | .................... | H02M 3/158 |
| 2023/0246615 A1 * | 8/2023 | Arnold | .................... | H02M 1/08 |
| | | | | 327/379 |
| 2023/0318436 A1 * | 10/2023 | Du | .......................... | H02M 1/08 |
| | | | | 323/282 |
| 2023/0341444 A1 * | 10/2023 | Desai | .................. | H02M 1/0009 |
| 2024/0030820 A1 * | 1/2024 | Kessler | ............. | H02M 3/33571 |

* cited by examiner

*Primary Examiner* — Gustavo A Rosario-Benitez
(74) *Attorney, Agent, or Firm* — Schwabe, Williamson & Wyatt, P.C.

(57) ABSTRACT

Embodiments herein relate to a voltage converter which includes a soft switching driver for a low-side transistor which is in series with a high-side transistor to provide a desired output voltage Vx. The soft switching driver receives Vx on a feedback path and includes a clipper transistor to clip or reduce a maximum voltage of Vx to Vxsen. A restore circuit can be used to effectively add back a threshold voltage drop of the clipper transistor which would otherwise occur by holding a source of the clipper transistor at Vdrv, a gate voltage of the clipper transistor. A zero-voltage switching circuit receives Vxsen to provide an output voltage which in turn sets a control gate voltage of the low-side transistor. The low-side and high-side transistors may be GaN-based while the soft switching driver is CMOS based.

19 Claims, 9 Drawing Sheets

100

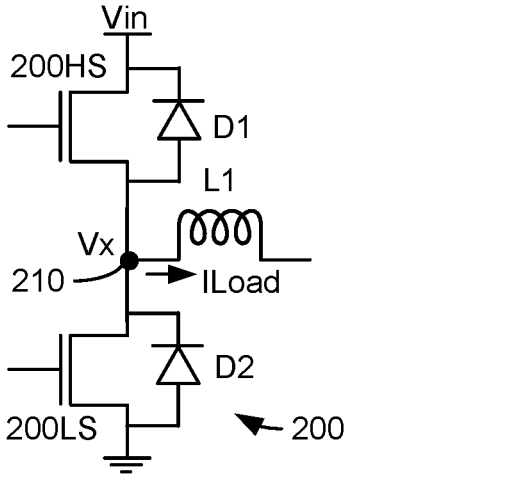
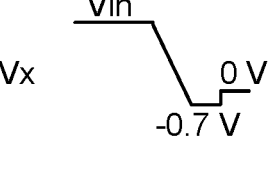
Fig. 2B
Fig. 2A
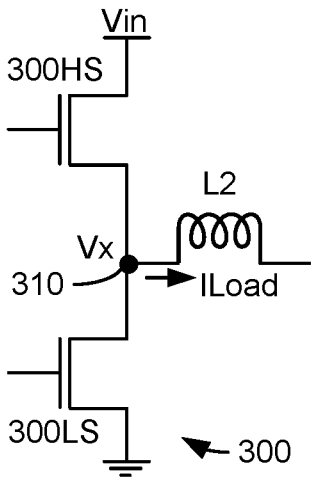
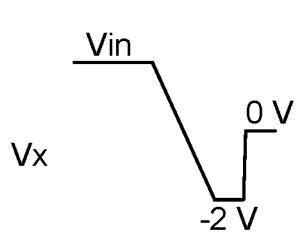
Fig. 3B
Fig. 3A

SOFT SWITCHING FOR EFFICIENT NON-CMOS BASED DC-DC CONVERTER

FIELD

The present application generally relates to the field of direct current-to-direct current (DC-DC) voltage converters.

BACKGROUND

DC-to-DC voltage converters, also referred to as power converters, are useful for converting a power supply at one voltage to another voltage. For example, a voltage converter can convert the main supply voltage of a computing device, such as 12 V, down to lower voltages, such as 5 V, 3.3 V or 1.8 V. The lower voltages can be used by various components in the computing device. These components can include a Universal Serial Bus (USB) interface, memory such as dynamic random access memory (DRAM) and processing resources such as a central processing unit (CPU). However, various challenges are presented in operating a voltage converter.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 2A depicts an example metal-oxide semiconductor (MO S)-based DC-to-DC converter in which the MOS transistors have an intrinsic body diode, in accordance with various embodiments.

FIG. 2B depicts an example plot of output voltage Vx versus time for the DC-to-DC converter of FIG. 2A, where the minimum voltage is limited to, e.g., 0.7 V, by the body diode, in accordance with various embodiments.

FIG. 3A depicts an example Gallium Nitride (GaN)-based DC-to-DC converter in which the transistors lack an intrinsic body diode, in accordance with various embodiments.

FIG. 3B depicts an example plot of output voltage Vx versus time for the GaN-based DC-to-DC converter of FIG. 3A, where the minimum voltage can fall to a very low level such as −2 or −3 V.

DETAILED DESCRIPTION

Figure 1:
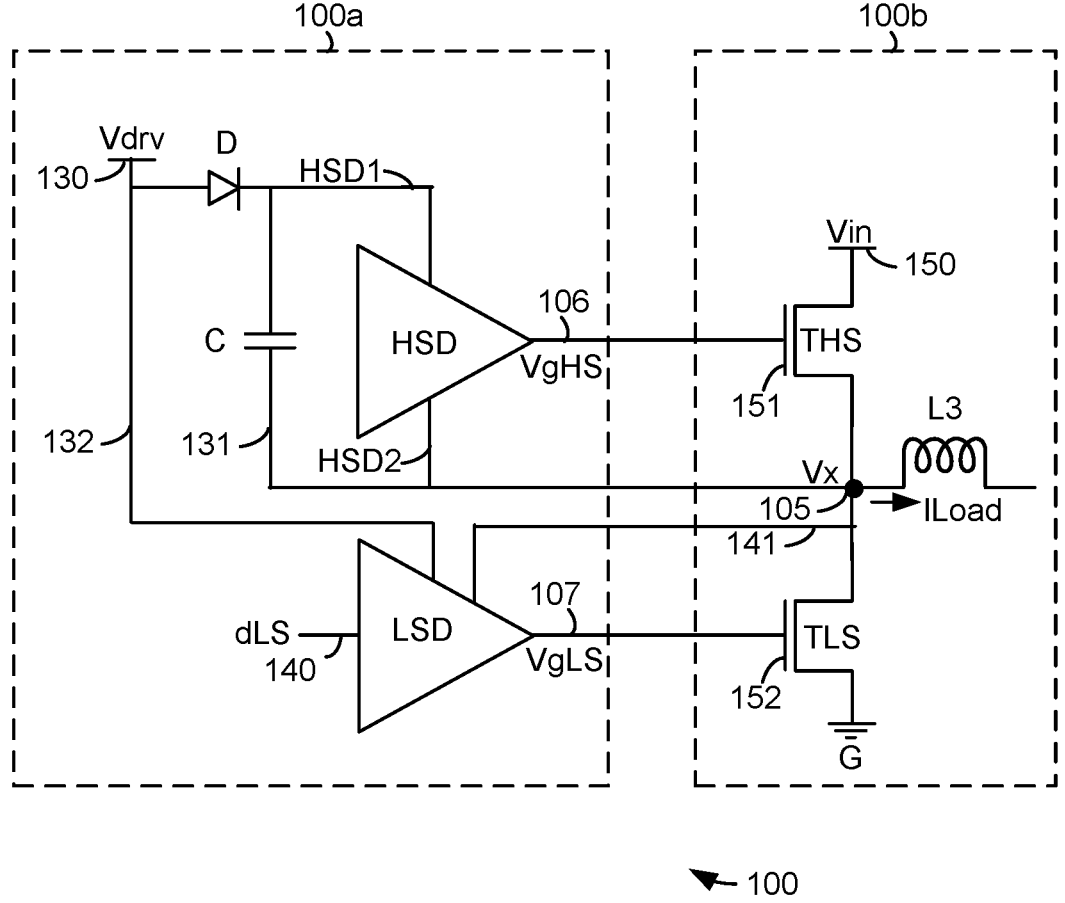
FIG. 1 depicts an example GaN-based DC-to-DC converter which includes a high voltage, soft switching Low Side driver (LSD), in accordance with various embodiments.

As mentioned at the outset, various challenges are presented in operating a voltage converter.

Recently, there is a trend towards using high voltage, high-frequency DC-DC converters for improved load line performance, high-power density and high end-to-end efficiency. However, as the input voltage increases and the switching frequency is pushed to tens of MHz, efficiency is compromised due to high switching losses. One possible solution involves high-frequency, high voltage GaN N-type devices which have been introduced to replace conventional silicon-based complementary metal-oxide semiconductor (CMOS) technology in power train implementations due to their far superior figures of merits and high voltage capability. CMOS is a type of metal-oxide-semiconductor field-effect transistor fabrication process that uses complementary and symmetrical pairs of p-type and n-type MOSFETs in silicon for logic functions. Gallium nitride (GaN) is a stable, wide bandgap semiconductor which has a higher breakdown strength, faster switching speed, higher thermal conductivity and lower on-resistance than silicon-based devices. To fabricate the transistors, Gallium nitride crystals can be grown as an epitaxial layer on substrates such as sapphire, silicon carbide (SiC) and silicon (Si).

The GaN devices can include high-side (HS) and low-side (LS) transistors (also referred to as devices or switches) arranged in series, where an output voltage Vx is taken at a point between the two transistors, referred to as an inductor switching node. The output voltage is provided to an inductor which provides a steady voltage even as Vx oscillates. Typically, a pulse width modulation (PWM) signal is applied to the transistors to provide the output voltage at a desired level. A duty cycle of the PWM signal is set to alternately turn on the high-side and low-side transistors. The output voltage can be increased by turning on the high-side transistor, and turning off the low-side transistor, for a greater portion of each cycle of the PWM signal.

A first problem arises in that the GaN device structure, unlike MOS, does not have an intrinsic device body diode. In a MOS transistor, a body diode is formed by the p-n junction between the source and drain.

Therefore, during the dead time, in which high-side and low-side switches of the voltage converter are simultaneously turned off, the output voltage Vx can fall to a very low level such as −2 or −3 V compared to only about 0.7 V for a MOS device. 0.7 V is a typical voltage drop for a diode. These very low levels can result in device damage during high input voltage (Vin) and high current load (ILoad) conditions because of the gate-to-source (Vgs) breakdown. Hence, a GaN-based converter requires special circuits to ensure optimal dead time and instantaneous response to ILoad and Vin changes.

A second problem arises in that, while GaN devices can be used in power train implementations to support high input voltage, (e.g., Vin can go up to 12 V), they can't be used in any of the driver or control circuitry due to their layout constraint and asymmetric voltage rating. Hence, the low voltage CMOS devices are still the only available option for the implementation of the driver and any control circuits including the soft switching. The low voltage device rating is not compatible with the high Vx voltage requirement which can go up to Vin.

Some solutions for soft switching in a high voltage DC-DC converter result in non-optimal dead time which increases the losses and limit the maximum frequency and maximum Vin/ILoad of the converter.

Soft switching means that one or more power switches in a DC-DC converter have either the turn-on or turn-off switching losses eliminated. This is in contrast to hard switching, where both turn-on and turnoff of the power switches are done at high current and high voltage levels. Moreover, in synchronous rectification, a high-side switch and a low-side switch are turned on and off in alternation. Ideally, switching should be performed such that there is no time in which switches on both sides are simultaneously either turned on or turned off. However, this is difficult to achieve in practice. To ensure safe operation, an interval, referred to as a dead time, is provided in which the switches on both sides are simultaneously turned off.

High frequency, high voltage GaN-based converters can only be superior in reliability and efficiency if the losses and destructive overcharge resulting from non-optimal dead time are eliminated over a wide range of ILoad and Vin. This can be achieved by implementing an adaptive dead time with picoseconds resolution that changes instantaneously with any ILoad or Vin change.

In particular, some soft switching solutions use a fixed dead time between the turn-off of the high-side switch and the turn-on of the low-side switch. Other solutions use a passive resistor-capacitor (RC) voltage divider network to step down the high voltage of the Vx node (to avoid exceeding the maximum CMOS voltage) and then use a comparator to compare this divided voltage with a generated reference voltage (Vx<Vth) and calibrate the dead time accordingly over multiple cycles. However, variations and mismatch of the passive devices and the comparator result in a non-optimal dead time. In addition, the large calibration settling time shortens the lifetime of the device. Others solutions use current sensing to sense current in power switches and detect body diode conduction to implement an adaptive dead time. However, this is not applicable to GaN-based devices.

The disadvantages of the previous solutions can be further understood as follow. Fixed dead time changes across process, voltage and temperature (PVT) variations of a chip are not suitable for high switching frequency converters that operates across a wide range of Vin and output load ranges. A fixed dead time results in high power loss and reliability concerns for GaN devices. For example, at a low load current, a small dead time will result in hard switching losses and efficiency degradation. On the other hand, at a high load current, a large dead time will result in having the Vx of the GaN-based converter fall to lower negative values (due to the lack of the body diode) resulting in Vgs breakdown.

Solutions that include an RC divider network and comparator for dead time calibration require large passive devices that can support a high voltage. In addition, the variation and mismatch in the RC divider and comparator result in an inaccurate dead time that. This, in turn, degrades efficiency and reliability due to the early or late turn ON of the LS switch which limits the maximum switching frequency (Fsw) and Vin of the converter. Moreover, the comparator-based bang-bang calibration takes multiple cycles to settle with any Vin or ILd variation. With bang-bang calibration, a signal flips back and forth between 0 and 1 values. This shortens the device life time and doesn't result in a high resolution dead time. The adaptive dead time control methods that rely on detecting the body diode forward voltage at the low-side switch by sensing current in power switches can't be used for GaN devices due to their lack of body diode. In addition, the technique has a limited minimum dead time of several nanoseconds due to the propagation delay of the detection circuits, thus limiting the maximum switching frequency, especially in a high voltage converter.

A voltage converter disclosed herein addresses the above and other issues. In one aspect, a voltage converter is provided which includes a high-side transistor and a low-side transistor in series, an output node coupled between the high-side transistor and the low-side transistor, and a driver having an output coupled to a control gate of the low-side transistor, where the driver is to receive a voltage of the output node on a feedback path and, in response to the voltage of the output node, provide soft switching of the low-side transistor.

In some embodiments, the voltage converter has no analog circuits and no comparators, and hence is not sensitive to PVT variations or mismatch. In one approach, the soft switching driver can use a single N-type device with a gate voltage equal to a driver voltage, Vdrv, to clip the high inductor switching node, Vx, which switches between '0' and Win' to '0'. This N-type device can be a symmetric device of a same type as the driver as long as the device gate-to-drain voltage, Vgd, can increase to as high as Vin-Vdrv. Or, it can be an asymmetric device to support a higher Vgd for a high Vin range (e.g., Vin=12 V).

Further, a pair of back-to-back inverters can be used to restore the clipped voltage to a full CMOS swing, Vxsen, such that no transistor on the driver side exceeds the maximum CMOS voltage.

The soft switching driver can further include a zero-voltage switching (ZVS) circuit, which is a digital based circuit, which utilizes Vxsen and turns ON the LS power switch only at the negative edge of Vxsen when Vx=Vth in the same cycle, where Vth is a threshold voltage. Hence, the voltage converter ZVS-based soft switching driver avoids the uncontrolled high negative Vx values of GaN devices and has picosecond resolution to perform instantaneous adaptive soft switching to ILd and Vin changes in the same cycle with no need for dead time calibration. ZVS means that the power to a load is switched on or off only when the output voltage is 0 V.

The voltage converter has a number of advantages. For example, it enables a reliable, high frequency, high voltage, high current power management integrated circuit (PMIC)-based solution with high power density and eliminates the need for two stage converters, thus improving the end-to-end efficiency and reducing the area. PMICs are integrated circuits that include multiple power rails and power management functions within a single chip.

Bringing in a higher voltage, voltage regulator (VR) minimizes the input current. This significantly reduces the power distribution losses (RLoss) in higher current applications such as servers and graphics processing units (GPUs). Increasing the switching frequency reduces the die area/cost, decoupling and inductor size and improves load line performance. This frees up area for additional board features and input/output (I/O) routing corridors.

This voltage converter can be used in a variety of applications. One example is in power management integrated circuit (PMIC) chips with discrete inductors or chiplets integrated in a package with package-integrated inductors with high input voltages coming in from the platform.

These and other features will be further apparent in view of the following discussion.

FIG. 1 depicts an example GaN-based DC-to-DC converter 100 which includes a high voltage, soft switching LS driver (LSD), in accordance with various embodiments. A first portion 100a of the voltage converter can be provided using low voltage CMOS technology while a second portion 100b is GaN-based, for example. The portion 100a is fabricated on silicon and the portion 100b may be fabricated on GaN. In another option, the second portion 100b is laterally diffused (LD) CMOS (LDMOS) based. GaN-based and LDMOS-based are two example of non-CMOS based technologies in which the techniques can be applied and are particularly advantageous. However, the techniques can also be applied when the portions 100a and 100b are both CMOS based. In asymmetric devices such as GaN and LDMOS, P-devices are generally not used because the figure of merit and performance of N-devices is superior. Hence, we have a non-CMOS implementation, in one approach. This is not the case for FinFET symmetric devices because the figure of merit for N and P devices is almost the same, so we use a CMOS based implementation.

The second portion 100b includes a pair of transistors arranged serially, including a high-side transistor THS and a low-side transistor TLS. These can be considered power transistors. The second portion 100b can be considered to be a power stage of the voltage converter. THS is coupled at its drain to a power supply 150 at Vin and TLS is coupled at its source to ground G. An output node 105 between the two transistors in a serial path from the power supply 150 to ground has a voltage Vx which is provided to an inductor L3 to generate a current Iload. THS has a control gate 151 which is driven by a voltage VgHS on a path 106 from a HS driver (HSD). Similarly, TLS has a control gate 152 which is driven by a voltage VgLS on a path 107 from the LSD.

The drivers HSD and LSD are in the first portion 100a. The HSD is controlled by signals on a first input path HSD1 and a second input path HSD2. HSD1 and HSD2 are provided via a diode D coupled to a power supply node 130 at a drive voltage, Vdrv. The signal on HSD2 is provided via a path 131 which is coupled to the switch via a capacitor C. The capacitor can be part of a bootstrap circuit which is used to drive the high-side (HS) switch, THS, and turn on the N-device of the THS. HSD1 is shifted version of HSD2.

The LSD is controlled by a drive signal dLS on an input path 140 and by Vx on a feedback path 141. The LSD also receives Vdrv via a path 132.

FIG. 2A depicts an example metal-oxide semiconductor (MOS)-based DC-to-DC converter 200 in which the MOS transistors have an intrinsic body diode, in accordance with various embodiments. A MOS transistor is fabricated on a silicon substrate. The voltage converter includes a high-side transistor 200HS in series with a low-side transistor 200LS. The high-side transistor is coupled at its drain to a power supply Vin and the low-side transistor is coupled at its source to ground. An output node 210 between the two transistors has a voltage Vx which is provided to an inductor L1 to generate a current Iload. The transistors 200HS and 200LS have body diodes D1 and D2, respectively, and are both nMOS transistors in this example.

As mentioned, a MOS device has an intrinsic body diode that limits the minimum Vx to about –0.7 V, regardless of the Iload and Vin conditions, thereby protecting the device from Vgs breakdown. Moreover, the impact of non-optimal dead time on reliability is minimum compared to GaN devices.

FIG. 2B depicts an example plot of output voltage Vx versus time for the DC-to-DC converter of FIG. 2A, where the minimum voltage is limited to, e.g., 0.7 V, by the body diode, in accordance with various embodiments. In an example switching cycle of the voltage converter, Vx decreases from a maximum level of Vin to a minimum of –0.7 V, for example, before returning to 0 V. Vx=Vin when 200HS is turned on (conductive) and 200LS is turned off.

FIG. 3A depicts an example Gallium Nitride (GaN)-based DC-to-DC converter 300 in which the transistors lack an intrinsic body diode, in accordance with various embodiments. A GaN-based transistor is fabricated on a GaN substrate. The voltage converter includes a high-side transistor 300HS in series with a low-side transistor 300LS. The high-side transistor is coupled at its drain to a power supply Vin and the low-side transistor is coupled at its source to ground. An output node 310 between the two transistors has a voltage Vx which is provided to an inductor L2 to generate a current Iload. The transistors 300HS and 300LS do not have a body diode. They can be n-type transistors which are turned off when Vgs=0 V and turned on when Vgs>Vth.

As a result, as mentioned, Vx can fall to as low as –2 to –3 V depending on Vin and Iload. This exceeds the Vgs breakdown level, resulting in damage to the logic field effect transistor (FET) of the gate driver and the GaN switch. This demonstrates the importance of building an adaptive optimal dead time control to improve the reliability of switches at high current.

FIG. 3B depicts an example plot of output voltage Vx versus time for the GaN-based DC-to-DC converter of FIG. 3A, where the minimum voltage can fall to a very low level such as –2 or –3 V. In an example switching cycle of the voltage converter, Vx decreases from a maximum level of Vin to a minimum of –2 V, for example, before returning to 0 V.

Figures 4, 5:
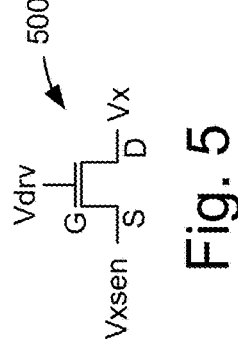
FIG. 4 depicts an example implementation of the LSD of FIG. 1, in accordance with various embodiments.
FIG. 5 depicts an example implementation of the clipper circuit 421 of FIG. 4 as an n-type metal-oxide-semiconductor (nMOS) transistor, in accordance with various embodiments.

FIG. 4 depicts an example implementation of the LSD of FIG. 1, in accordance with various embodiments. The LSD includes a driver stage 410, a restore circuit 420, a ZVS circuit 430 and a delay circuit 440. The driver stage includes a high-side transistor TA, which is a pMOS transistor, for example, and a low-side transistor TB, which is an nMOS transistor, for example. TA is coupled at its source to a power supply 450 at Vdrv and TB is coupled at its source to ground. An output node 405 between the two transistors has the voltage VgLS which is provided to the inductor L3 on the path 107.

A control gate 411 of TA receives a signal via a path 413 while a control gate 412 of TB receives a signal via a path 414. The paths 413 and 414 in turn are coupled by a connector path 415.

A clipper circuit 421 receives the voltage Vx and clips or reduces its magnitude, if necessary, to ensure it is below a specified level such as Vdrv. The clipper circuit thus reduces a maximum voltage of Vx. Vdrv=1.8 V, 3.3 V or 5 V, for example. If Vx<Vdrv–Vth, it may not be clipped. A voltage Vxsen is output by the clipper circuit on a path 422 and provided to a pair of back-to-back inverters in a restore circuit 420. The back-to-back inverters restore Vxsen to full swing switching between 0 and Vdrv instead of 0 and Vdrv-Vth to ensure proper functionality of the digital CMOS ZVS circuit. The back-to-back inverters comprise two inverters, for instance. The first inverter 423 is formed by an nMOS transistor T1 and a pMOS transistor T3 in series. The second inverter 424 is formed by a pMOS transistor T2 and an nMOS transistor T4 in series. Further, the pair T1 and T3 are in parallel with T2 and T4.

The paths 425 and 427 can be used to ground the path 422 via an nMOS transistor T5, a bypass or grounding transistor, which receives a control gate signal phen. If phen is high, the ground path is enabled and the ZVS circuit 430 is disabled, as Vxsen is set to 0 V. If phen is low, e.g., 0 V, the ZVS circuit 430 is enabled as Vxsen is not changed.

The transistor 500 of FIG. 5 is a clipper transistor. If Vx<Vdrv-Vth, transistor 500 is in the ON state, making Vxsen=Vx. If Vx>Vdrv-Vth, transistor 500 is in the OFF state because Vgs<Vth and the back-to-back inverters hold the Vx node 422 at the restored value=Vdrv. The back-to-back inverters act as a latch and a restorer. When Vxsen would equal Vdrv-Vth, in the absence of the back-to-back inverters, due to the drain-to-source voltage drop of Vth in the clipper transistor, the back-to-back inverters restore Vxsen, at the source of the clipper transistor, to Vdrv. The back-to-back inverters also ensure that Vxsen is latched and driven when the clipper transistor 500 is off at Vx>Vdrv-Vth. Vxsen is provided to the ZVS circuit 430 on a path 426. T1 and T2 are coupled at their source to Vdrv. T1 is coupled at its drain on a path 428 to a drain of T3. T1 is coupled at its gate on a path 429 to the gate of T3. T2 is coupled at its drain to a drain of T4 via a path 432. Also, the path 428 is coupled to the path 432 by a path 433, and the path 429 is coupled to the path 432 by a path 434.

The ZVS circuit 430 receives Vxsen and provides it at an input 431i to a transmission gate 431. The transmission gate includes an nMOS transistor which receives the drive signal dLS on its control gate and a pMOS transistor which receives dLS bar, an opposite polarity of dLS. The transmission gate is to turn on TA when dLS is high, e.g., equal to a logical 1 and only if Vx<Vdrv-Vth. An output 4310 of the transmission gate is coupled to the control gate 411 of TA and the control gate 412 of TB. Essentially, when dLS is high, Vxsen at the input 431i is passed to the output 4310 and to the control gates 411 and 412. In one approach, if Vxsen is a positive voltage when dLS is high, TA will be off and TB will be on, thus setting VgLS=0 V. If Vxsen is at or close to zero, TA will turn on and TB will turn off, thus setting VgLS=Vdrv (see t3 in FIG. 6). With dLS high, T6 is off so that Vdrv is not passed to the control gates from the power supply node 450. The pMOS transistor T6 receives dLS at its control gate, the output of the transmission gate on its drain side and Vdrv on its source side.

If dLS is low, e.g., 0 V, Vxsen is not passed to the control gates 411 and 412 since the transmission gate is turned off. However, T6 is on, so that Vdrv is passed to the control gates, turning off TA and turning on TB, thus setting VgLS=0 V.

The delay circuit 440 includes a delay component 441 which is to kick start the LSD in the first cycle due to the N-N topology, which refers to n-type transistors. The delay component 441 receives dLS and, in response, outputs a signal to a control gate of an nMOS transistor Ta. Another nMOS transistor Tb, coupled in series with Ta, also has its control gate coupled to receive dLS. These transistors couple the path 414 to the path 442.

FIG. 5 depicts an example implementation of the clipper circuit 421 of FIG. 4 as an n-type metal-oxide-semiconductor (nMOS) transistor 500, in accordance with various embodiments. The transistor has a drain side (D) at Vx, a source side (S) at Vxsen and a control gate (G) at Vdrv. The drain side is coupled to the node 105 via the feedback path 141 (FIG. 1). As mentioned, if Vx<Vdrv-Vth, transistor 500 is in an ON state (turned on or conductive), making Vxsen=Vx. If Vx>Vdrv-Vth, the transistor 500 is in an OFF state (turned off or non-conductive) because Vgs<Vth and the back-to-back inverters hold the Vxsen node at the restored value of Vdrv.

The soft switching LDS circuit can be implemented all digitally. The high voltage of the Vx node can exceed the maximum voltage allowed by the CMOS driver. A single transistor 500 with its gate connected to Vdrv can act as a high voltage clipper to clip the high inductor switching node, Vx, which switches between 0 V and Vin, to between 0 V and Vdrv-Vth. Then, the back-to-back inverters act as restorer to regenerate a full CMOS swing signal, Vxsen, signal switching between 0 and Vdrv, such that no transistor exceeds the maximum CMOS voltage in the LS driver, LSD. The back-to-back inverters will restore Vxsen to full swing between 0 and Vdrv, as long as the signal is higher than the switching threshold. Then, the transmission gate 431 with the LS power switch input signal, dLS, and Vxsen as inputs act as a same cycle fast embedded ZVS circuit that turns ON the LS power switch only if the LS driver input signal, dLS, is 'high' and Vxsen=Vdrv-Vth or 0 V. The driver transistor TA will turn ON when Vxsen=Vdrv-Vth because Vgs=Vth.

Figure 6:
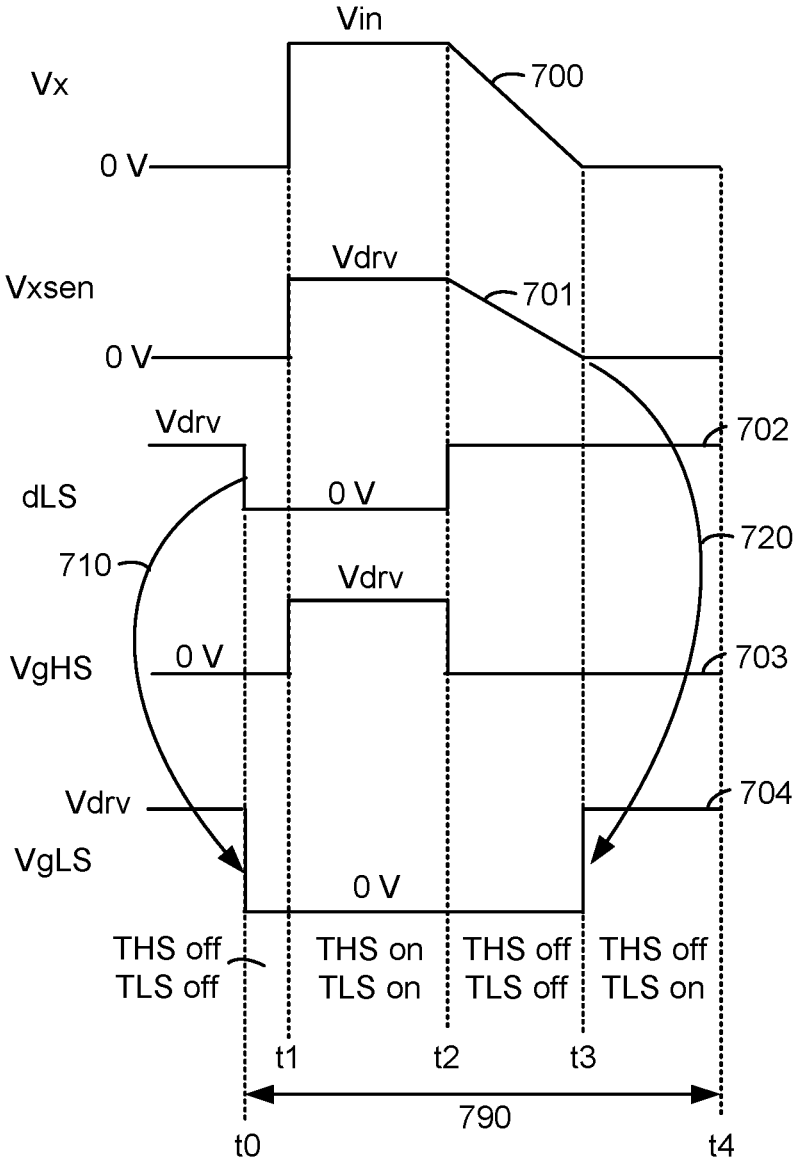
FIG. 6 depicts example plots of Vx, Vxsen, dLS, VgHS and VgLS, consistent with the circuits of FIGS. 1 and 4, in accordance with various embodiments.

FIG. 6 depicts example plots 700, 701, 702, 703 and 704 of Vx, Vxsen, dLS, VgHS and VgLS, respectively consistent with the circuits of FIGS. 1 and 4, in accordance with various embodiments. For each plot, the vertical direction represents voltage and the horizontal direction represents time. The plots extend over one switching cycle 790 and are repeated in subsequent cycles, not shown. The timing diagram shows the operation of the first portion 100a of the voltage converter 100, which includes the HSD to output VgHS to THS, and the LSD to output VgLS to TLS (FIG. 1). LSD is a high voltage soft switching driver, as mentioned.

A time line include time points t0-t4, where the cycle extends from t0-t4. In the time period t0-t1, VgHS=0 V and VgLS=0 V so THS and TLS are both off. In the time period t1-t2, VgHS=Vdrv and VgLS=0 V so THS is on and TLS is off. In the time period t2-t3, VgHS=0 V and VgLS=0 V so THS and TLS are both off. This is the dead time which varies for different devices and different PVT and other conditions. In the time period t3-t4, VgHS=0 V and VgLS=Vdrv so THS is off and TLS is on. The time period t0-t1 can be fixed while the time period t2-t3 is adaptive based on when Vxsen reaches 0 V, for example (see arrow 720). Arrow 710 indicates the drop in VgLS from Vdrv to 0 V is triggered by the drop in dLS from Vdrv to 0 V. The time period t1-t2 is set based on a duty cycle, which can vary over time.

Plot 700 depicts Vx, the output voltage of the voltage converter 100. It increases from 0 V to Vin at t1, remains at Vin until t2, then ramps down to 0 V from t2-t3. As mentioned, this ramp down period can vary for different devices due to PVT variations and other factors. The ramp down period is not necessarily to scale. Plot 701 shows the high voltage inductor switching node, Vx, after it is clipped and restored to a full CMOS swing, to provide Vxsen. Vxsen is maintained at Vdrv from t1-t2 then ramps down to 0 V from t2-t3. Plot 702 shows the driver input signal, dLS. It transitions from Vdrv to 0 V at t0, then from 0 V to Vdrv at t2. Plot 703 shows VgHS, which transitions from 0 V to Vdrv at t1 and back to 0 V at t2. The transition from 0 V to Vdrv at t1 is triggered by the transition of dLS at t0. The transition is delayed from t0 to t1 by another dead time circuit at the high side. This is not related to the capacitor C of the bootstrap circuit. This delay is implemented to ensure that the TLS is off when THS turns on.

Plot 704 shows VgLS, which transitions from Vdrv to 0 V at t1 and back to Vdrv at t3.

The falling edge of the LS driver output, VgLS, at t0, is triggered by the falling edge of the driver input signal, dLS (see arrow 710). The rising edge of VgLS, which turns on the LS power switch, is triggered by the ramp down or falling edge of the Vxsen node, ensuring that the LSD switch turns ON only at Vx~Vth or 0 V. This essentially achieves ZVS and prevents the Vx of the GaN-based converter from falling into high negative values, which degrades the device and shortens its lifetime.

Figures 7, 8:
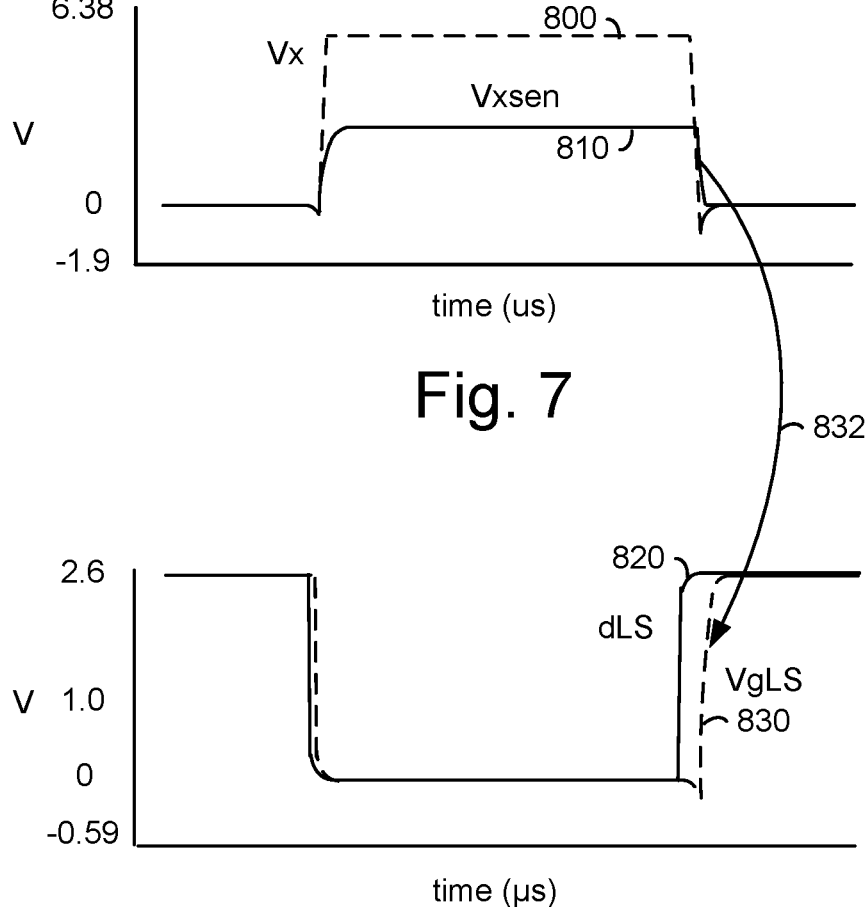
FIG. 7 depicts example plots of Vx and Vxsen, consistent with the circuit of FIG. 4, in accordance with various embodiments.
FIG. 8 depicts example plots of dLS and VgLS, consistent with the circuit of FIG. 4, in accordance with various embodiments.

FIG. 7 depicts example plots 800 and 810 of Vx and Vxsen, respectively, consistent with the circuit of FIG. 4, in accordance with various embodiments. The vertical direction represents voltage and the horizontal direction represents time. The plots represent a simulation of the high voltage inductor switching node, Vx, and the sensed clipped version, Vxsen. The plots show how Vx is clipped to Vxsen.

FIG. 8 depicts example plots 820 and 830 of dLS and VgLS, respectively, consistent with the circuit of FIG. 4, in accordance with various embodiments. The vertical direction represents voltage and the horizontal direction represents time. The plots show the low-side driver input, dLS, and the output, VgLS, (which is also the gate voltage of the LS power switch, TLS). The falling edge of dLS triggers VgLS to turn OFF the LS switch (TLS) and the falling edge of Vxsen triggers VgLS to turn ON the LS switch. The rising edge of VgLS that turns ON the LS power switch is only triggered by the falling edge of Vxsen (arrow 832) and is independent of the rising edge of dLS.

Figure 9:
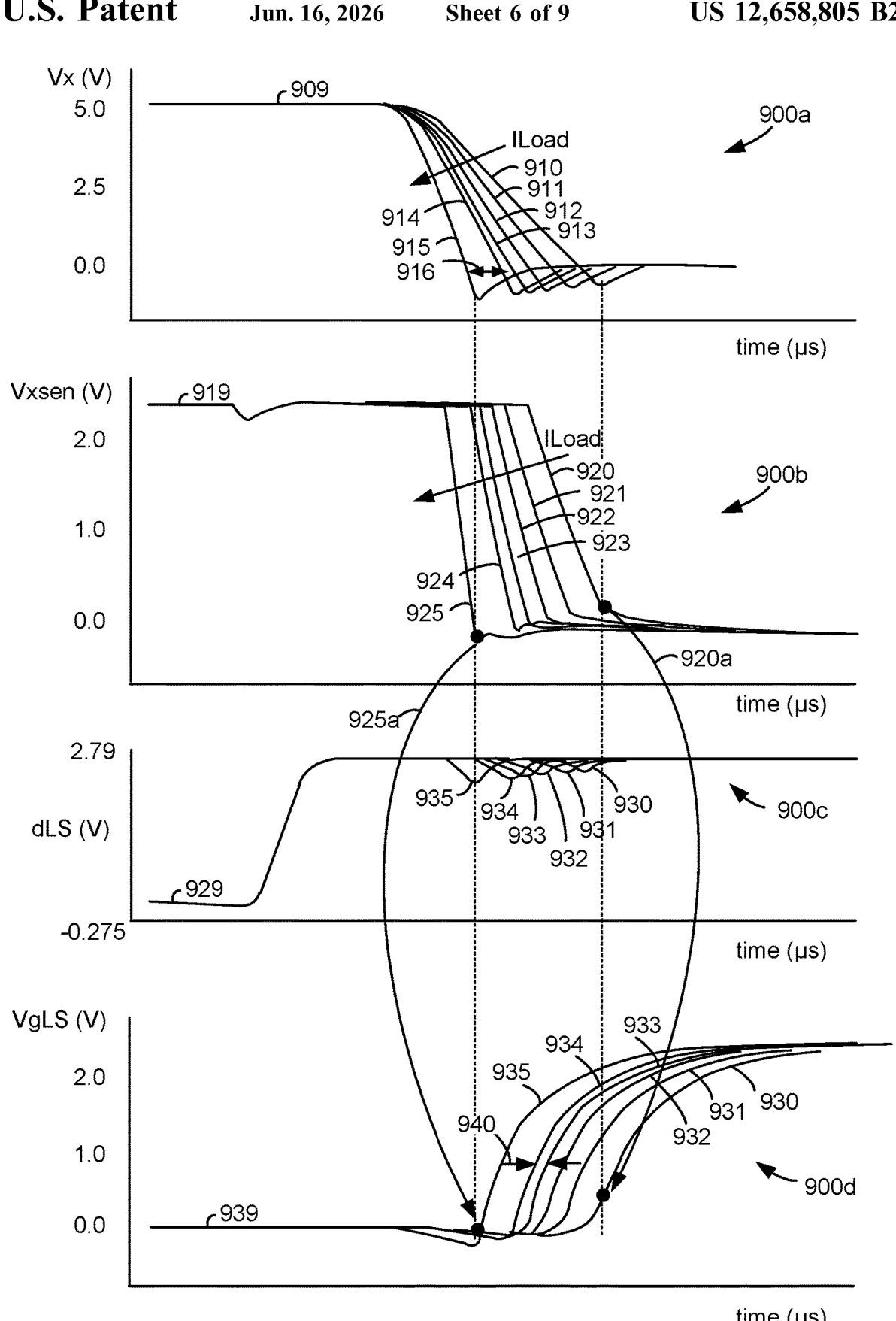
FIG. 9 depicts example plots of Vx, Vxsen, dLS and VgLS, for different values of load current, ILoad, consistent with the circuit of FIG. 4, in accordance with various embodiments.

FIG. 9 depicts example plots 900a, 900b, 900c and 900d of Vx, Vxsen, dLS and VgLS, respectively, for different values of ILoad, consistent with the circuit of FIG. 4, in accordance with various embodiments. For Vx, the plots 900a include a common plot 909, which is fixed at about 5.4 V, for example, and plots 910-915 which represent Vx falling time decreasing for ILoad=2, 4, 6, 8, 10 and 20 A, respectively. An arrow 916 represents a time period of less than 250 picoseconds, for example. This is the time at which the plot 915 undershoots to less than 0 V, e.g., Vx<0 or the time spent in a phase where Vx<0. This reflects on the reliability, since the duration for having a negative Vx is very short.

For Vxsen, the plots 900b include a common plot 919, which is fixed at about 2.5 V, for example, and plots 920-925 which represent Vxsen falling time decreasing for ILoad=2, 4, 6, 8, 10 and 20 A, respectively.

For dLS, the plots 900c include a common plot 929 which starts at about 0 V and increases to about 2.5 V. Plots 930-935 represent a temporary decrease in dLS for ILoad=2, 4, 6, 8, 10 and 20 A, respectively, due to the reduction of Vxsen.

For VgLS, the plots 900d include a common plot 939 which starts at 0 V before increasing to about 2.5 V. Plots 930-935 represent the increase in VgLS for ILoad=2, 4, 6, 8, 10 and 20 A, respectively. An arrow 940 represents an example dead time high resolution of less than 50 picoseconds. This represent a delay between the plots 933 and 934.

FIG. 9 thus shows the response of the adaptive ZVS soft switching driver to changes in ILoad. The Vx falling time changes with ILoad. The embedded high voltage ZVS has zero delay and <50 ps dead time resolution which results in optimum dead time and superior efficiency that doesn't limit the maximum frequency of the voltage converter.

The arrow 925a depicts a correspondence between an inflection point of the plot 925, after a decrease of the voltage, where plot 915 is at a minimum, and a point on the plot 935. The arrow 920a depicts a correspondence between an inflection point of the plot 920, after a decrease of the voltage, where plot 910 is at a minimum, and a point on the plot 930.

Figure 10:
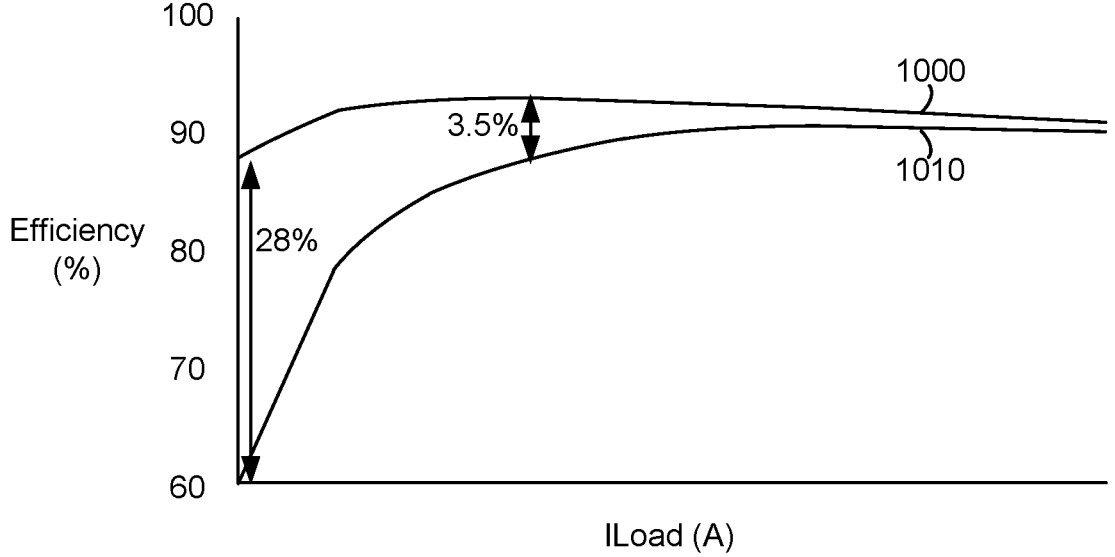
FIG. 10 depicts example plots of efficiency versus ILoad, consistent with the circuit of FIG. 4, showing an increased efficiency for soft switching (plot 1000) versus hard switching (plot 1010), in accordance with various embodiments.

FIG. 10 depicts example plots of efficiency versus ILoad, consistent with the circuit of FIG. 4, showing an increased efficiency for soft switching (plot 1000) versus hard switching (plot 1010), in accordance with various embodiments. The vertical axis depicts efficiency in percent and the horizontal axis depicts ILoad in amps (A). This shows the efficiency benefit of the high voltage, soft switching LS driver in comparison to hard switching. The high voltage, soft switching driver shows a 28% efficiency improvement at low current and a 3.5% efficiency improvement at thermal design current (TDC). The plots are based on a configuration of: Vin=5.4 V, Vout=0.8 V, temp=100 C, L=10 nm, Q=100, Rdc=1.1 S2 Ohms (series resistance of inductor) and Fsw=5 MHz (switching frequency).

Figure 11:
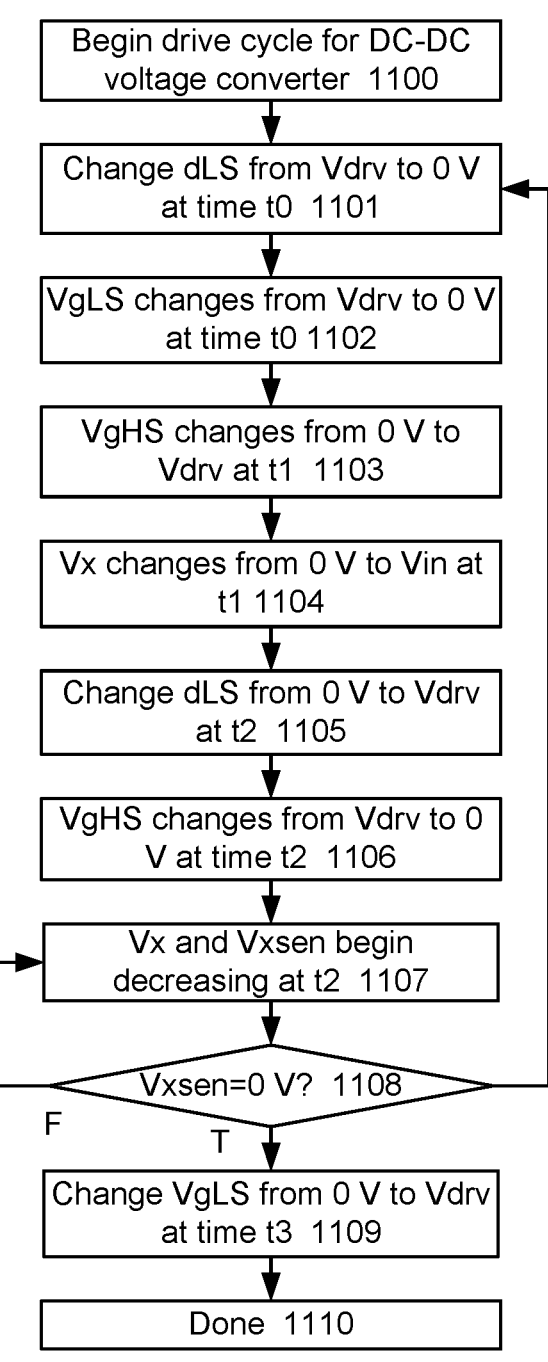
FIG. 11 depicts a flowchart of an example process for operating the circuits of FIGS. 1 and 4, in accordance with various embodiments.

FIG. 11 depicts a flowchart of an example process for operating the circuits of FIGS. 1 and 4, consistent with the time line of FIG. 6, in accordance with various embodiments. Step 1100 begins a drive cycle for a DC-DC voltage converter, e.g., at time t0 in FIG. 6. Step 1101 includes changing dLS from Vdrv to 0 V at time to. In response, step 1102 indicates that VgLS changes from Vdrv to 0 V. Additionally, after a delay, VgHS changes from 0 V to Vdrv at t1, at step 1103. This in turn causes Vx to change from 0 V to Vin at t1, at step 1104, to provide a positive output voltage from the power converter. Essentially, Vin is passed to Vx via THS (see FIG. 1). Subsequently, based on the desired duty cycle, dLS is set high, changing from 0 V to Vdrv, at step 1105. In response, VgHS changes from Vdrv to 0 V at t2, at step 1106. THS is thus turned off. At step 1107, Vx and Vxsen begin decreasing toward 0 V at t2.

A decision step 1108 determines whether Vxsen=0 V or has otherwise decreased below some specified level. For example, the decision step could determine whether Vxsen<Vth of the transistor 500. If the decision step is false (F), the process continues at step 1107. If the decision step is true (T), step 1109 indicates VgLS is changed from 0 V to Vdrv, thus setting Vx=0 V. Essentially, TLS is turned on to ground Vx. Step 1110 indicates the process is done (at t4) and can be repeated for a next cycle.

Figure 12:
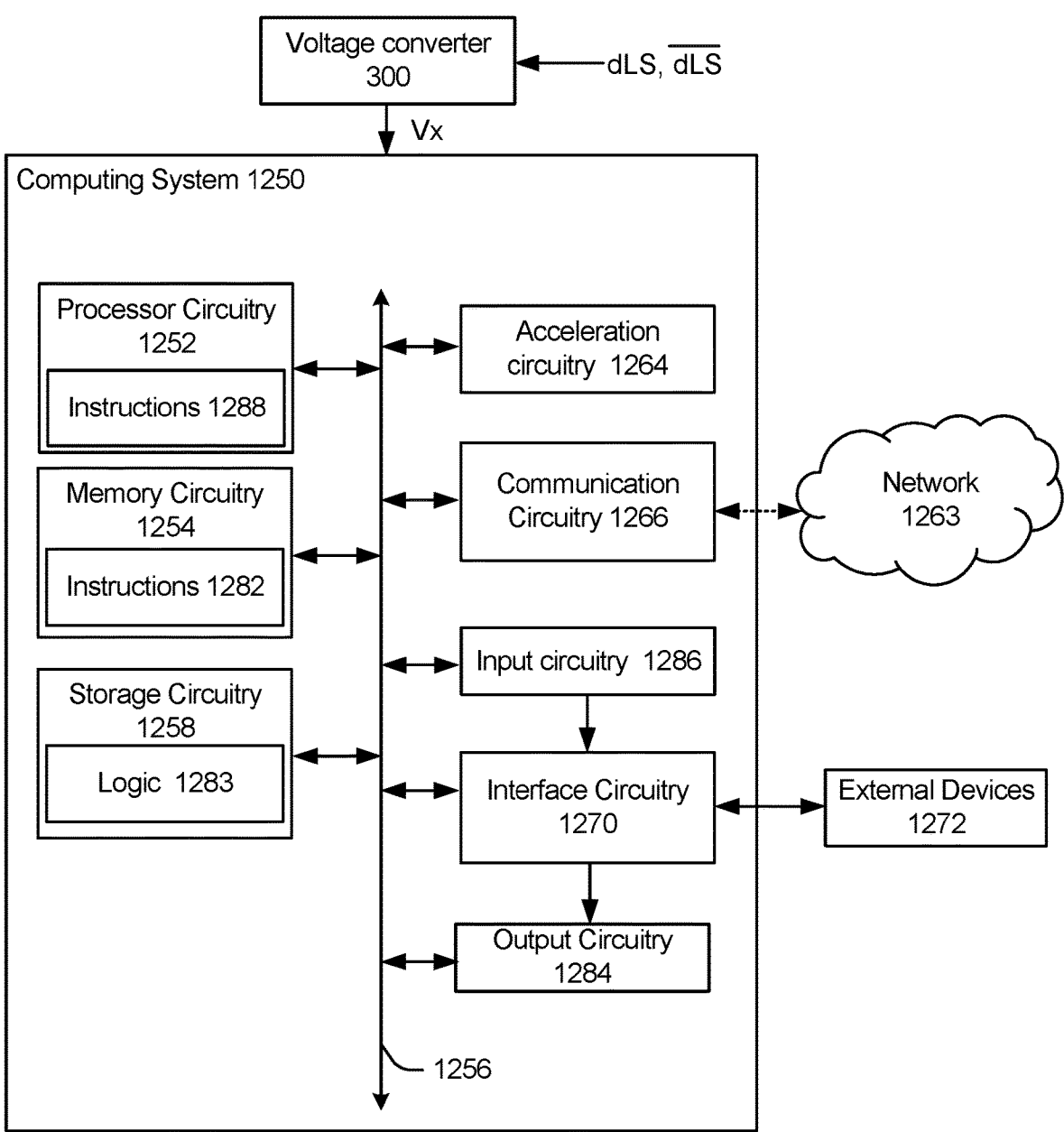
FIG. 12 illustrates an example of components that may be present in a computing system 1250 for implementing the techniques (e.g., operations, processes, methods, and methodologies) described herein.

FIG. 12 illustrates an example of components that may be present in a computing system 1250 for implementing the techniques (e.g., operations, processes, methods, and methodologies) described herein. The voltage converter 100 may provide a voltage Vx to one or more of the components of the computing system 1250. The voltage converter may be controlled by control signals dLS and dLS bar which may be PWM signals provided by the processor circuitry 1252.

The memory circuitry 1254 may store instructions and the processor circuitry 1252 may execute the instructions to perform the functions described herein including the processes of FIG. 11.

The computing system 1250 may include any combinations of the hardware or logical components referenced herein. The components may be implemented as ICs, portions thereof, discrete electronic devices, or other modules, instruction sets, programmable logic or algorithms, hardware, hardware accelerators, software, firmware, or a combination thereof adapted in the computing system 1250, or as components otherwise incorporated within a chassis of a larger system. For one embodiment, at least one processor 1252 may be packaged together with computational logic 1282 and configured to practice aspects of various example embodiments described herein to form a System in Package (SiP) or a System on Chip (SoC).

The system 1250 includes processor circuitry in the form of one or more processors 1252. The processor circuitry 1252 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1252 may include one or more hardware accelerators (e.g., same or similar to acceleration circuitry 1264), which may be microprocessors, programmable processing devices (e.g., FPGA, ASIC, etc.), or the like. The one or more accelerators may include, for example, computer vision and/or deep learning accelerators. In some implementations, the processor circuitry 1252 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1252 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 1252 may be coupled with or may include memory/storage and may be configured to execute instructions stored in the memory/storage to enable various applications or operating systems to run on the platform 1250. The processors (or cores) 1252 is configured to operate application software to provide a specific service to a user of the platform 1250. In some embodiments, the processor(s) 1252 may be a special-purpose processor(s)/controller(s) configured (or configurable) to operate according to the various embodiments herein.

As examples, the processor(s) 1252 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1252 may be a part of a system on a chip (SoC), System-in-Package (SiP), a multi-chip package (MCP), and/or the like, in which the processor(s) 1252 and other components are formed into a single integrated circuit, or a single package, such as the Edison™ or Galileo™ SoC boards from Intel® Corporation. Other examples of the processor(s) 1252 are mentioned elsewhere in the present disclosure.

The system 1250 may include or be coupled to acceleration circuitry 1264, which may be embodied by one or more AI/ML accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as complex (CPLDs) or high complexity PLDs (HCPLDs), and/or other forms of specialized processors or circuitry designed to accomplish one or more specialized tasks. These tasks may include AI/ML processing (e.g., including training, inferencing, and classification operations), visual data processing, network data processing, object detection, rule analysis, or the like. In FPGA-based implementations, the acceleration circuitry 1264 may comprise logic blocks or logic fabric and other interconnected resources that may be programmed (configured) to perform various functions, such as the procedures, methods, functions, etc. of the various embodiments discussed herein. In such implementations, the acceleration circuitry 1264 may also include memory cells (e.g., EPROM, EEPROM, flash memory, static memory (e.g., SRAM, anti-fuses, etc.) used to store logic blocks, logic fabric, data, etc. in LUTs and the like.

In some implementations, the processor circuitry 1252 and/or acceleration circuitry 1264 may include hardware elements specifically tailored for machine learning and/or artificial intelligence (AI) functionality. In these implementations, the processor circuitry 1252 and/or acceleration circuitry 1264 may be, or may include, an AI engine chip that can run many different kinds of AI instruction sets once loaded with the appropriate weightings and training code. Additionally or alternatively, the processor circuitry 1252 and/or acceleration circuitry 1264 may be, or may include, AI accelerator(s), which may be one or more of the aforementioned hardware accelerators designed for hardware acceleration of AI applications. As examples, these processor(s) or accelerators may be a cluster of artificial intelligence (AI) GPUs, tensor processing units (TPUs) developed by Google® Inc., Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 1252 and/or acceleration circuitry 1264 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like. In some hardware-based implementations, individual subsystems of system 1250 may be operated by the respective AI accelerating co-processor(s), AI GPUs, TPUs, or hardware accelerators (e.g., FPGAs, ASICs, DSPs, SoCs, etc.), etc., that are configured with appropriate logic blocks, bit stream(s), etc. to perform their respective functions.

The system 1250 also includes system memory 1254. Any number of memory devices may be used to provide for a given amount of system memory. As examples, the memory 1254 may be, or include, volatile memory such as random access memory (RAM), static RAM (SRAM), dynamic RAM (DRAM), synchronous DRAM (SDRAM), RAMBUS® Dynamic Random Access Memory (RDRAM®), and/or any other desired type of volatile memory device. Additionally or alternatively, the memory 1254 may be, or include, non-volatile memory such as read-only memory (ROM), erasable programmable ROM (EPROM), electrically erasable programmable (EEPROM), flash memory, non-volatile RAM, ferroelectric RAM, phase-change memory (PCM), flash memory, and/or any other desired type of non-volatile memory device. Access to the memory 1254 is controlled by a memory controller. The individual memory devices may be of any number of different package types such as single die package (SDP), dual die package (DDP) or quad die package (Q17P). Any number of other memory implementations may be used, such as dual inline memory modules (DIMMs) of different varieties including but not limited to microDIMMs or MiniDIMMs.

Storage circuitry 1258 provides persistent storage of information such as data, applications, operating systems and so forth. In an example, the storage 1258 may be implemented via a solid-state disk drive (SSDD) and/or high-speed electrically erasable memory (commonly referred to as "flash memory"). Other devices that may be used for the storage 1258 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, a hard disk drive (HDD), micro HDD, of a combination thereof, and/or any other memory. The memory circuitry 1254 and/or storage circuitry 1258 may also incorporate three-dimensional (3D) cross-point (XPOINT) memories from Intel® and Micron®.

The memory circuitry 1254 and/or storage circuitry 1258 is/are configured to store computational logic 1283 in the form of software, firmware, microcode, or hardware-level instructions to implement the techniques described herein. The computational logic 1283 may be employed to store working copies and/or permanent copies of programming instructions, or data to create the programming instructions, for the operation of various components of system 1250 (e.g., drivers, libraries, application programming interfaces (APIs), etc.), an operating system of system 1250, one or more applications, and/or for carrying out the embodiments discussed herein. The computational logic 1283 may be stored or loaded into memory circuitry 1254 as instructions 1282, or data to create the instructions 1282, which are then accessed for execution by the processor circuitry 1252 to carry out the functions described herein. The processor circuitry 1252 and/or the acceleration circuitry 1264 accesses the memory circuitry 1254 and/or the storage circuitry 1258 over the interconnect (IX) 1256. The instructions 1282 direct the processor circuitry 1252 to perform a specific sequence or flow of actions, for example, as described with respect to flowchart(s) and block diagram(s) of operations and functionality depicted previously. The various elements may be implemented by assembler instructions supported by processor circuitry 1252 or high-level languages that may be compiled into instructions 1288, or data to create the instructions 1288, to be executed by the processor circuitry 1252. The permanent copy of the programming instructions may be placed into persistent storage devices of storage circuitry 1258 in the factory or in the field through, for example, a distribution medium (not shown), through a communication interface (e.g., from a distribution server (not shown)), over-the-air (OTA), or any combination thereof.

The IX 1256 couples the processor 1252 to communication circuitry 1266 for communications with other devices, such as a remote server (not shown) and the like. The communication circuitry 1266 is a hardware element, or collection of hardware elements, used to communicate over one or more networks 1263 and/or with other devices. In one example, communication circuitry 1266 is, or includes, transceiver circuitry configured to enable wireless communications using any number of frequencies and protocols such as, for example, the Institute of Electrical and Electronics Engineers (IEEE) 802.11 (and/or variants thereof), IEEE 802.23.4, Bluetooth® and/or Bluetooth® low energy (BLE), ZigBee®, LoRaWAN™ (Long Range Wide Area Network), a cellular protocol such as 3GPP LTE and/or Fifth Generation (5G)/New Radio (NR), and/or the like. Additionally or alternatively, communication circuitry 1266 is, or includes, one or more network interface controllers (NICs) to enable wired communication using, for example, an Ethernet connection, Controller Area Network (CAN), Local Interconnect Network (LIN), DeviceNet, ControlNet, Data Highway+, or PROFINET, among many others.

The IX 1256 also couples the processor 1252 to interface circuitry 1270 that is used to connect system 1250 with one or more external devices 1272. The external devices 1272 may include, for example, sensors, actuators, positioning circuitry (e.g., global navigation satellite system (GNSS)/ Global Positioning System (GPS) circuitry), client devices, servers, network appliances (e.g., switches, hubs, routers, etc.), integrated photonics devices (e.g., optical neural network (ONN) integrated circuit (IC) and/or the like), and/or other like devices.

In some optional examples, various input/output (I/O) devices may be present within or connected to, the system 1250, which are referred to as input circuitry 1286 and output circuitry 1284. The input circuitry 1286 and output circuitry 1284 include one or more user interfaces designed to enable user interaction with the platform 1250 and/or peripheral component interfaces designed to enable peripheral component interaction with the platform 1250. Input circuitry 1286 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1284 may be included to show information or otherwise convey information, such as sensor readings, actuator position(s), or other like information. Data and/or graphics may be displayed on one or more user interface components of the output circuitry 1284. Output circuitry 1284 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 1250. The output circuitry 1284 may also include speakers and/or other audio emitting devices, printer(s), and/or the like. Additionally or alternatively, sensor(s) may be used as the input circuitry 1284 (e.g., an image capture device, motion capture device, or the like) and one or more actuators may be used as the output device circuitry 1284 (e.g., an actuator to provide haptic feedback or the like). Peripheral component interfaces may include, but are not limited to, a non-volatile memory port, a USB port, an audio jack, a power supply interface, etc. In some embodiments, a display or console hardware, in the context of the present system, may be used to provide output and receive input of an edge computing system; to manage components or services of an edge computing system; identify a state of an edge computing component or service; or to conduct any other number of management or administration functions or service use cases.

The components of the system 1250 may communicate over the IX 1256. The IX 1256 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 1256 may be a proprietary bus, for example, used in a SoC based system.

The number, capability, and/or capacity of the elements of system 1250 may vary, depending on whether computing system 1250 is used as a stationary computing device (e.g., a server computer in a data center, a workstation, a desktop computer, etc.) or a mobile computing device (e.g., a smartphone, tablet computing device, laptop computer, game console, IoT device, etc.). In various implementations, the computing device system 1250 may comprise one or more components of a data center, a desktop computer, a workstation, a laptop, a smartphone, a tablet, a digital camera, a smart appliance, a smart home hub, a network appliance, and/or any other device/system that processes data.

The techniques described herein can be performed partially or wholly by software or other instructions provided in a machine-readable storage medium (e.g., memory). The software is stored as processor-executable instructions (e.g., instructions to implement any other processes discussed herein). Instructions associated with the flowchart (and/or various embodiments) and executed to implement embodiments of the disclosed subject matter may be implemented as part of an operating system or a specific application, component, program, object, module, routine, or other sequence of instructions or organization of sequences of instructions.

The storage medium can be a tangible machine readable medium such as read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs)), among others.

The storage medium may be included, e.g., in a communication device, a computing device, a network device, a personal digital assistant, a manufacturing tool, a mobile communication device, a cellular phone, a notebook computer, a tablet, a game console, a set top box, an embedded system, a TV (television), or a personal desktop computer.

Some non-limiting examples of various embodiments are presented below.

Example 1 includes an apparatus, comprising: a high-side transistor and a low-side transistor in series; an output node coupled between the high-side transistor and the low-side transistor; and a driver having an output coupled to a control gate of the low-side transistor, wherein the driver is to receive a voltage of the output node on a feedback path and, in response to the voltage of the output node, provide soft switching of the low-side transistor.

Example 2 includes the apparatus of Example 1, wherein the driver comprises a clipper transistor having a drain coupled to the output node, and a control gate coupled to a driver voltage, Vdrv, and the clipper transistor is to clip the voltage of the output node.

Example 3 includes the apparatus of Example 2, further comprising a pair of back-to-back inverters coupled to a source of the clipper transistor, wherein the pair of back-to-back inverters is to hold a voltage of the source of the clipper transistor at Vdrv when Vx>Vdrv−Vth, where Vth is a threshold voltage of the clipper transistor, to turn off the clipper transistor.

Example 4 includes the apparatus of Example 2, wherein a voltage of a source of the clipper transistor is equal to Vx when Vx<Vdrv−Vth, where Vth is a threshold voltage of the clipper transistor, to turn on the clipper transistor.

Example 5 includes the apparatus of Example 4, further comprising: a zero-voltage switching circuit coupled to the clipper transistor; and a driver stage coupled to the zero-voltage switching circuit, wherein the driver stage is responsive to the zero-voltage switching circuit to provide a control signal to a control gate of the low-side transistor.

Example 6 includes the apparatus of Example 5, further comprising a transistor to ground the source of the clipper transistor to disable the zero-voltage switching circuit.

Example 7 includes the apparatus of Example 5, wherein the zero-voltage switching circuit comprises a transmission gate having an input and an output, the input of the transmission gate is coupled to the source, and the output of the transmission gate is coupled to the driver stage.

Example 8 includes the apparatus of Example 7, wherein the transmission gate comprises an nMOS transistor and a pMOS transistor, the nMOS transistor is to receive a drive signal, and the pMOS transistor is to receive a signal opposite in polarity to the drive signal.

Example 9 includes the apparatus of any one of Examples 1-8, wherein the high-side transistor and low-side transistor are Gallium Nitride-based and the driver is CMOS-based.

Example 10 includes the apparatus of any one of Examples 1-9, wherein the driver is to high-side transistor and low-side transistor are non-CMOS based and the driver is CMOS-based.

Example 11 includes the apparatus of any one of Examples 1-10, wherein the driver is to ensure that the voltage of the output node has decreased below a specified level before turning on the low-side transistor.

Example 12 includes a driver, comprising: a clipper transistor comprising a drain to receive a voltage of an output node of a power stage; a restore circuit to hold a voltage of a source of the clipper transistor at the voltage of the output node; a zero-voltage switching circuit to receive a voltage from the restore circuit; and a driver stage to receive a voltage from the restore circuit and, based on the voltage received from the restore circuit, provide a voltage to the power stage.

Example 13 includes the driver of Example 12, wherein: the output node is between a high-side transistor and a low-side transistor of the power stage; and the voltage provided to the power stage comprises a control gate voltage for the low-side transistor.

Example 14 includes the driver of Example 13, wherein: the driver stage is to ensure that the voltage of the output node has decreased below a specified level before turning on the low-side transistor.

Example 15 includes the driver of any of Examples 12-14, wherein the driver is on silicon and the power stage is on Gallium Arsenide.

Example 16 includes an apparatus, comprising: a high-side transistor and a low-side transistor; an output node coupled between the high-side transistor and the low-side transistor; and a driver comprising an output coupled to a control gate of the low-side transistor, wherein the driver is to ensure that a voltage of the output node has decreased below a specified level before turning on the low-side transistor.

Example 17 includes the apparatus of claim 16, wherein the high-side transistor and the low-side transistor are on Gallium Arsenide and the driver is on silicon.

Example 18 includes the apparatus of claim 16 or 17, wherein the high-side transistor and the low-side transistor are not based on a complementary metal-oxide semiconductor (CMOS) and the driver is based on a CMOS.

Example 19 includes the apparatus of any one of claims 16-18, wherein the driver comprises a clipper circuit to clip the voltage of the output node.

Example 20 includes the apparatus of any one of claims 16-19, wherein the driver comprises a zero-voltage switching circuit and a driver stage coupled to the zero-voltage switching circuit, and the zero-voltage switching circuit is to provide a voltage to the driver stage to control a control gate voltage of the low-side transistor.

In the present detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus, comprising:
a high-side transistor and a low-side transistor in series;
an output node coupled between the high-side transistor and the low-side transistor;
a driver having an output coupled to a control gate of the low-side transistor, wherein the driver is configured to receive a voltage, Vx, of the output node on a feedback path and, in response to the voltage of the output node, provide soft switching of the low-side transistor;
wherein the driver comprises a clipper transistor having a drain coupled to the output node, and a control gate coupled to a driver voltage, Vdrv, and the clipper transistor is configured to clip the voltage of the output node; and
a pair of back-to-back inverters coupled to a source of the clipper transistor, wherein the pair of back-to-back inverters is configured to hold a voltage of the source of the clipper transistor at Vdrv when Vx>Vdrv−Vth, where Vth is a threshold voltage of the clipper transistor, to turn off the clipper transistor.

2. The apparatus of claim 1, wherein the voltage of the source of the clipper transistor is configured to turn on the clipper transistor when Vx<Vdrv−Vth.

3. The apparatus of claim 1, wherein the driver further comprises:
a zero-voltage switching circuit coupled to the clipper transistor;
a delay circuit coupled to the zero-voltage switching circuit; and
a driver stage coupled to the zero-voltage switching circuit and the delay circuit, wherein an output of the driver stage is coupled to the control gate of the low-side transistor.

4. The apparatus of claim 3, wherein the driver further comprises a transistor configured to ground the source of the clipper transistor to disable the zero-voltage switching circuit.

5. The apparatus of claim 3, wherein the zero-voltage switching circuit comprises a transmission gate having an input coupled to the source of the clipper transistor and an output coupled to the driver stage.

6. The apparatus of claim 5, wherein the transmission gate comprises an nMOS transistor and a pMOS transistor, the nMOS transistor is to receive a drive signal, and the pMOS transistor is to receive a signal opposite in polarity to the drive signal.

7. The apparatus of claim 1, wherein the high-side transistor and the low-side transistor are Gallium Nitride-based and the driver is CMOS-based.

8. The apparatus of claim 1, wherein the high-side transistor and the low-side transistor are non-CMOS based and the driver is CMOS-based.

9. The apparatus of claim 1, wherein the driver is configured to ensure that the voltage of the output node has decreased below a specified level before turning on the low-side transistor.

10. A driver, comprising:
a clipper transistor comprising a drain to receive a voltage Vx of an output node of a power stage, a source, and a control gate coupled to a driver voltage, Vdrv;
a restore circuit coupled to the source of the clipper transistor;
a zero-voltage switching circuit coupled to the source of the clipper transistor, wherein the restore circuit and the zero-voltage switching circuit are configured to hold a voltage of the source of the clipper transistor at Vdrv when Vx>Vdrv−Vth, where Vth is a threshold voltage of the clipper transistor; and
a driver stage coupled to the zero-voltage switching circuit, wherein the driver stage is configured to provide a voltage to a low-side transistor of the power stage.

11. The driver of claim 10, wherein:
the output node is between a high-side transistor and the low-side transistor of the power stage; and
the voltage provided to the power stage comprises a control gate voltage for the low-side transistor.

12. The driver of claim 11, wherein:
the driver stage is configured to ensure that the voltage of the output node has decreased below a specified level before turning on the low-side transistor.

13. The driver of claim 10, wherein the driver is on silicon substrate or layer and the power stage is on Gallium Arsenide layer or substrate.

14. An apparatus, comprising:
a high-side transistor and a low-side transistor;
an output node coupled between the high-side transistor and the low-side transistor;
and a driver comprising an output coupled to a control gate of the low-side transistor,
wherein the driver further comprises a clipper transistor comprising a drain coupled to the output node to receive a voltage Vx of the output node, a source, and a control gate coupled to a driver voltage, wherein the driver is configured to turn on the low-side transistor in response to detecting that a voltage Vxsen of the source of the clipper transistor has decreased below a threshold voltage Vth of the clipper transistor.

15. The apparatus of claim 14, wherein the high-side transistor and the low-side transistor are on a Gallium Arsenide substrate or layer and the driver is on a silicon substrate or layer.

16. The apparatus of claim 14, wherein the high-side transistor and the low-side transistor are not based on a complementary metal-oxide semiconductor (CMOS) and the driver is based on a CMOS.

17. The driver of claim 10, wherein the restore circuit comprises a pair of back-to-back inverters coupled to the source of the clipper transistor.

18. The driver of claim 10, wherein the clipper transistor is configured to turn off when the voltage of the source is held at Vdrv and Vx>Vdrv−Vth.

19. The driver of claim 11, wherein the driver stage comprises a p-type transistor in series with an n-type transistor, and a node between p-type transistor and the n-type transistor is coupled to a control gate of the low-side transistor of the power stage.

* * * * *